Aug. 29, 1933.                E. G McDONALD                1,924,613
                                  BRAKE
                            Filed Aug. 26, 1929

INVENTOR
EUGENE G. M<sup>c</sup>DONALD
BY
   H. O. Clayton
            ATTORNEY

Patented Aug. 29, 1933

1,924,613

UNITED STATES PATENT OFFICE 1,924,613

BRAKE

Eugene G. McDonald, South Bend, Ind., assignor to Bendix Brake Company, South Bend, Ind., a corporation of Illinois Application August 26, 1929. Serial No. 388,304

1 Claim. (Cl. 188—78)

This invention relates to brakes and is illustrated as embodied in an internal expanding type of automobile brake.

An object of the invention resides in the provision of a simple brake applying device preferably mounted to float with respect to the brake shoes or equivalent friction element to equalize brake applying pressures and also designed to vary its throw by means of a novel eccentrically mounted two-part cam.

In one desirable arrangement there is provided a brake applying shaft shown with a crank arm at one end and provided at its brake applying end with a reduced spindle portion adapted to eccentrically support spaced apart stampings with rollers therebetween constituting the camming means of the brake.

These and other objects and features of the invention, including novel and desirable details of construction and combinations of parts will be apparent from the following description of one illustrated embodiment shown in the accompanying drawing, in which.

Figure 1:
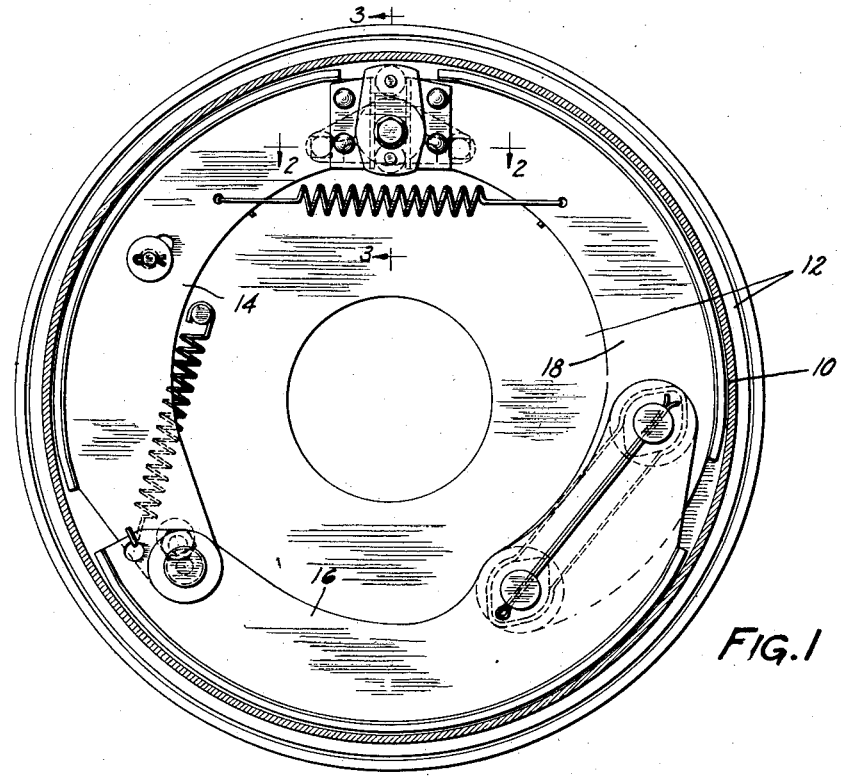
Figure 1 is a side elevation of the brake taken through the brake drum flange just inside the wheel.
Figure 2:
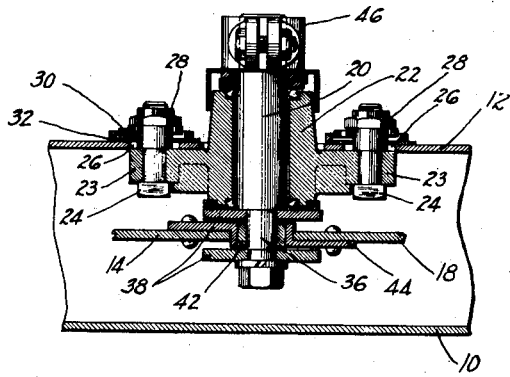
Figure 2 is a section through my novel applying means taken on the line 2—2 of Figure 1.
Figure 3:
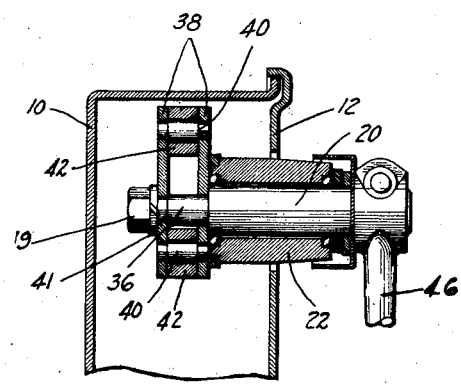
Figure 3 is a section taken through the applying means taken on the line 3—3 of Figure 1.

In the arrangement selected for illustration, the brake includes a rotatably mounted drum 10 at the open side of which may be arranged a backing plate or other support 12 and within which are arranged a plurality of brake shoes 14, 16 and 18 arranged as usual in a three-shoe commercial type of brake.

According to an important feature of my invention, the spaced apart ends of the adjacent shoes 14 and 18, or their equivalent, are adapted to receive a novel applying means therebetween. This applying means preferably comprises a cam shaft 20 rotatably mounted upon ball bearings in the end of a floating bearing 22, which bearing may be formed as a casting or forging secured at its side edges or wings 23 to the backing plate through the intermediary of bolts 24, the heads of which are adapted to pass through slots 26 in the backing plate, which slots are of greater length than the bolt width. Nuts 28 threaded on the ends of the bolts compress helical springs 30 against friction washers 32, which compressed washers and bolts serve to frictionally clamp the cam shaft bracket or bearing to the backing plate, while at the same time allowing a floating or shifting lateral movement thereof.

The cam shaft 20 is preferably shouldered at its inner end to provide a stub shaft or spindle 36, which shaft serves as a support for parallel stampings 38 constituting the end plates of my novel cam and secured to the spindle by nut 39 and lock washer 41. It is to be particularly noted that the stub shaft 36 is eccentrically mounted within the cam plates, that is, it is not passed through the geometrical center thereof, thus providing a different degree of throw for each of the brake shoes 14 and 18, it being obvious that the angular movement of the upper portion of the cam is greater than the angular movement of the lower portion thereof.

According to one important minor feature of my invention, the stampings constituting the end plates of the cam serve as bearings for shouldered spindles 40, which spindles are adapted to support rollers 42 which contact L-shaped thrust plates 44 riveted or otherwise secured to the webs of the brake shoes or equivalent structure, and which plates are straddled by the cam end plate.

In operation, rotation of the cam shaft 20, preferably by means of a crank arm 46 fixedly secured to the end of the shaft, serves to spread apart the brake shoes, shoes 14 and 16, which are pivoted to move together, moving approximately twice as fast as the short shoe 18, thus insuring simultaneous drum contact of all of the shoes of the brake. By virtue of the floating support for the cam shaft, the forces distributed to the ends of the shoes are equal, thus insuring equal lining wear to the two sections of the brake.

While one illustrative embodiment of my invention has been described in detail, it is not my intention to limit the invention to that particular embodiment or otherwise than by the scope of the appended claim.

I claim:

Brake-applying means comprising a shiftably-mounted bracket having spaced ball bearings, a shaft journaled in said bearings and having an operating lever at one end and a reduced-diameter portion at its other end, a pair of spaced plates mounted on the reduced-diameter portion, and a pair of thrust rollers mounted between said plates on opposite sides of the shaft.

EUGENE G. McDONALD.